United States Patent [19]

Suzuki

[11] Patent Number: 4,661,755
[45] Date of Patent: Apr. 28, 1987

[54] STEPPING MOTOR CONTROL APPARATUS
[75] Inventor: Hiroshi Suzuki, Saitama, Japan
[73] Assignee: Kabushiki Kaisha Toshiba, Kawasaki, Japan
[21] Appl. No.: 730,579
[22] Filed: May 6, 1985
[30] Foreign Application Priority Data May 9, 1984 [JP] Japan ................................ 59-92446

[51] Int. Cl.[4] .............................................. H02P 8/00
[52] U.S. Cl. ..................................... 318/696; 318/685
[58] Field of Search ................................ 318/696, 685
[56] References Cited

U.S. PATENT DOCUMENTS

| 3,893,012 | 7/1975 | Lin ....................................... | 318/696 |
| 3,903,467 | 9/1975 | Eckardt ............................... | 318/696 |
| 4,035,708 | 7/1977 | Schaff ................................. | 318/696 |
| 4,142,140 | 2/1979 | Wiesner .............................. | 318/696 |
| 4,147,968 | 4/1979 | Goble .................................. | 318/685 |

FOREIGN PATENT DOCUMENTS 0064391 4/1982 European Pat. Off. .
0083231 12/1982 European Pat. Off. .
2837623 5/1979 Fed. Rep. of Germany .
1459179 12/1976 United Kingdom .

Primary Examiner—William M. Shoop, Jr.
Assistant Examiner—Saul M. Bergmann
Attorney, Agent, or Firm—Cushman, Darby & Cushman

[57] ABSTRACT

A stepping motor control apparatus comprises two switching circuits and a control circuit. The first switching circuit stops the supply of excitation voltage to a stepping motor of a floppy disk drive when the disk drive is in standby state. The second switching circuit applies a high excitation voltage to rotate the motor after the disk drive has come out of the standby state, and applies a low excitation voltage while the motor is ready to rotate after the disk drive has come out of the standby state. The control circuit controls the second switching cirucit such that the high voltage is applied to the stepping motor until the floppy disc drive becomes able to correctly position a magnetic head after it has come out of the standby state.

9 Claims, 11 Drawing Figures

F I G. 1A
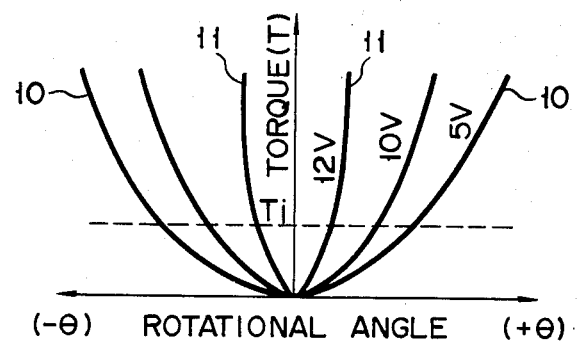
F I G. 1B
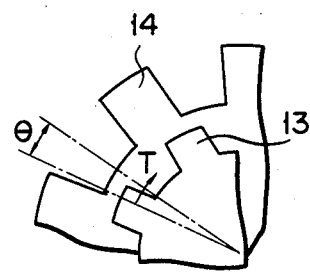

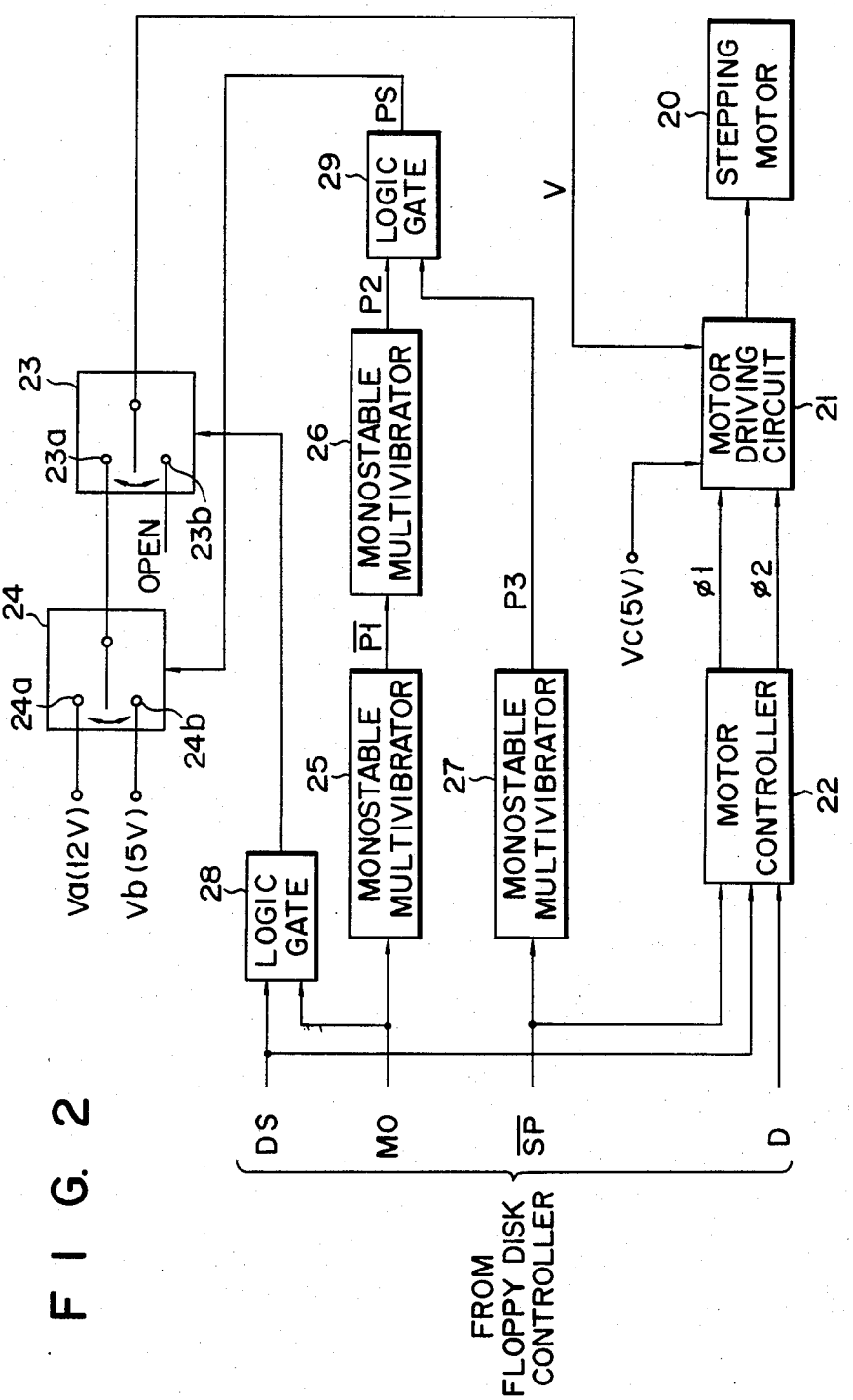
F I G. 2

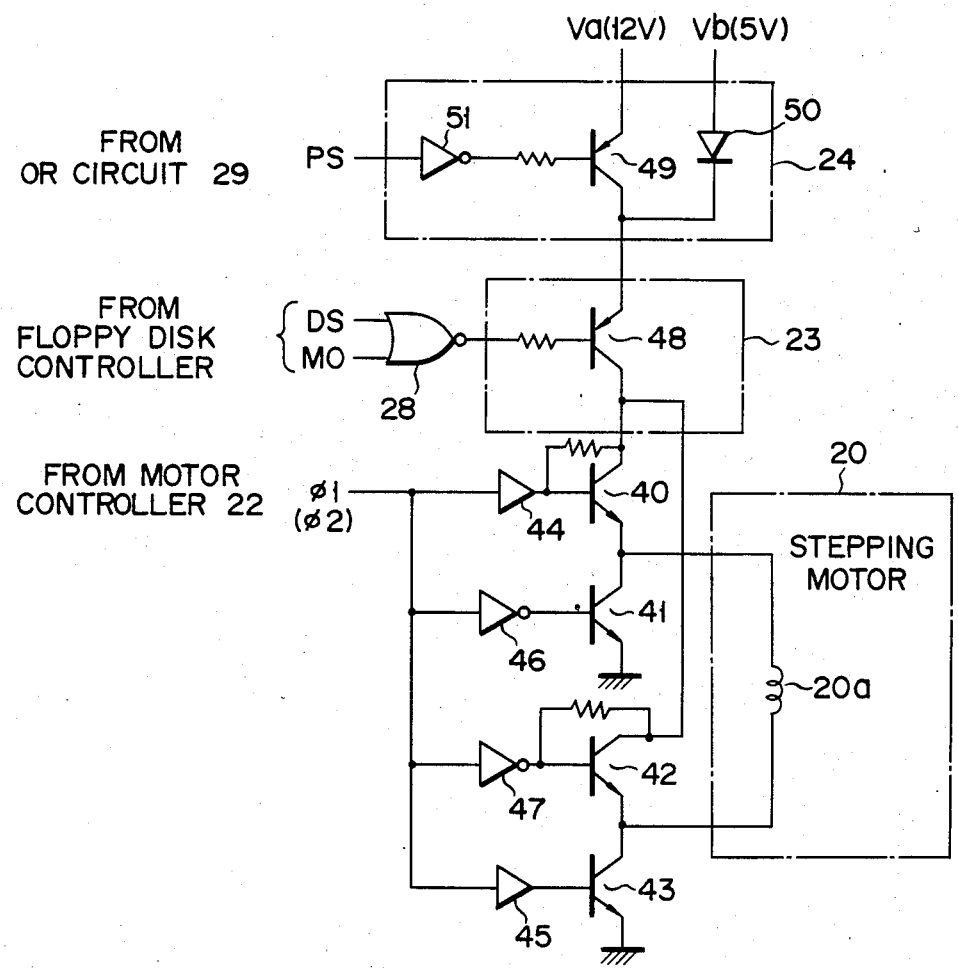
F I G. 4

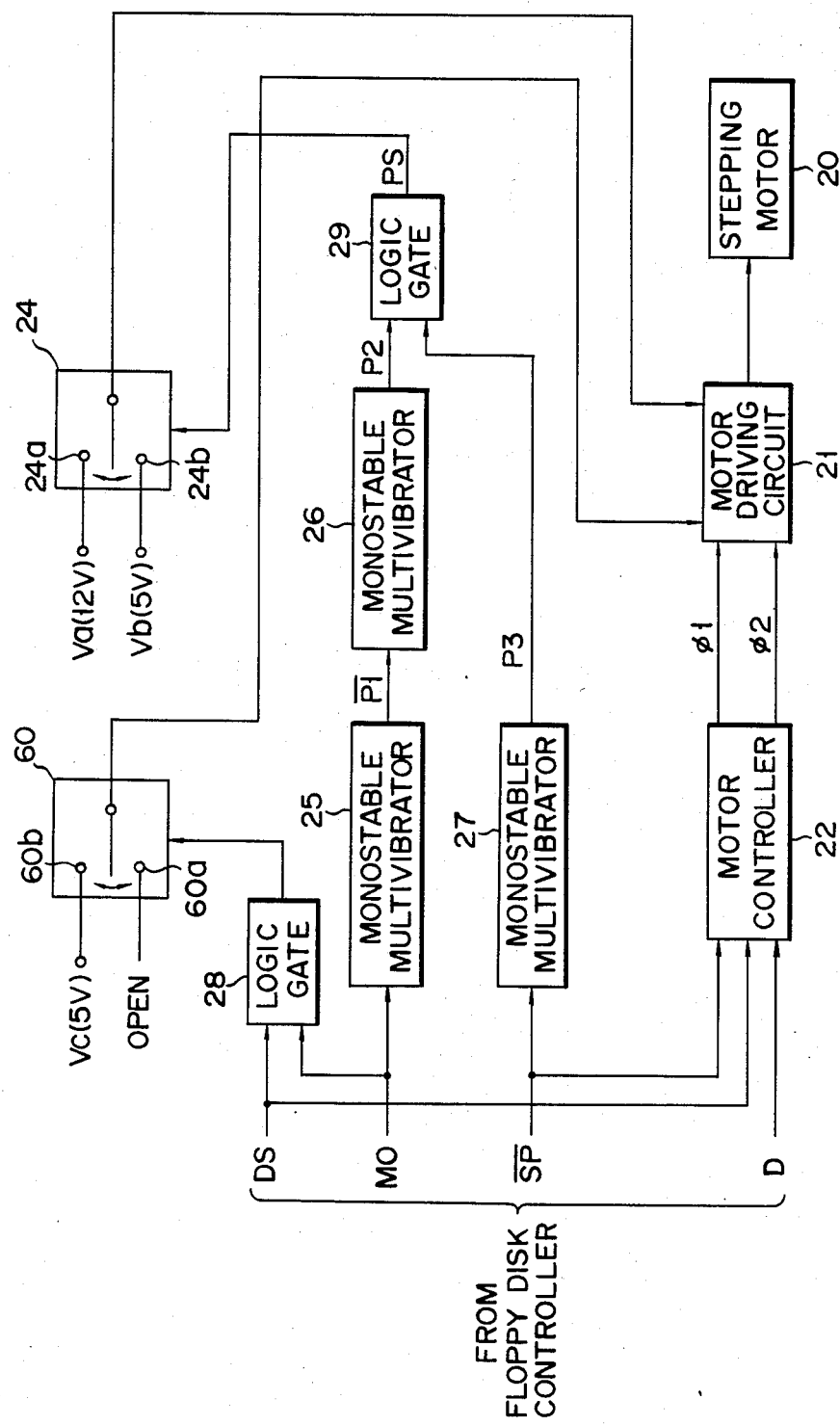
F I G. 6

STEPPING MOTOR CONTROL APPARATUS

BACKGROUND OF THE INVENTION

The present invention relates to an apparatus for controlling a stepping motor used to position, for example, the magnetic head of a floppy disk drive.

A stepping motor (usually called a "pulse motor") can easily be controlled and is used in various positioning devices. It is used in a floppy disk drive to move a magnetic head to the desired track of a magnetic disk, so that the head may write data on the track or read the data therefrom. Moving the head to a desired track is generally called the "seek operation."

When the floppy disk drive is accessed by a host computer, the magnetic head starts a read/write operation at the track where it is positioned or is moved by the stepping motor to another track and then starts the same operation at this track. The torque of the motor required for the seek operation is greater than the torque the motor must apply to hold the head at any track. In the conventional method, a high excitation voltage is applied to the motor for the seek operation, and the motor is driven by a low excitation voltage to hold the head at any track. If the same excitation voltage is applied to the motor for both operations, more power than necessary will be inevitably consumed. To save power further, no power is supplied to the motor while the disk drive remains to be accessed, which condition will be called the "standby state".

To make the magnetic head write on or read from the same track after the disk drive has come out of the standby state, a low excitation voltage is applied to the stepping motor. As shown in FIG. 1A, the angle $\theta$, by which the rotor 13 of the motor rotates with respect to the stator 14 to generate a predetermined torque T (FIG. 1B), is greater when the low excitation voltage (e.g., 5 V) is applied to the motor as shown by curve 10 in FIG. 1A than when a high excitation voltage (e.g., 12 V) is applied to the motor as shown by curve 11, provided the motor exerts the same torque Ti. Hence, the head cannot be positioned as accurately during the low voltage application as during the high voltage application. The known method of controlling a stepping motor can save power during the seek operation since the excitation voltage is low during this operation, but it has the abovementioned drawback.

To read data from and write data on the same track after the disk drive has come out of the standby state, the low excitation voltage is applied to the stepping motor to hold the head at the track. As stated above, however, angle $\theta$ is greater during the low voltage application than during the high voltage application. Hence, the head may not be so accurately positioned after the disk drive has been released from the standby state.

SUMMARY OF THE INVENTION

The object of the present invention is to provide a stepping mpotor control apparatus for use in a device for positioning, e.g., the magnetic head of a floppy disk drive at any desired track of a floppy disk, for saving power, and for driving the motor and positioning the magnetic head with a high accuracy.

According to the invention, there is provided a stepping motor control apparatus comprising: a stepping motor used in a positioning device and having excitation coils; stepping motor driving means for applying a high or low excitation voltage to the excitation coils of the stepping motor when the positioning device is in a non-standby state and for stopping the application of the excitation voltage when the positioning device is in a standby state; and control means for causing said stepping motor drive means to apply a high excitation voltage to the excitation coils of the stepping motor for a predetermined period after the positioning device has come out of the standby state, thereby stabilizing the operation of the positioning device.

According to the invention, the high excitation voltage is applied to the stepping motor after the positioning device has been released from the standby state. This stabilizes the operation of the positioning device and improves the accuracy of positioning the magnetic head. Since it suffices to apply only low voltage to the motor once the positioning device has come to operate stably, the power consumed by the motor can be reduced.

BRIEF DESCRIPTION OF THE DRAWINGS

FIG. 1A shows the relation between the rotation angle of a stepping motor and the torque generated by the motor;

FIG. 1B illustrates the positional relationship of the stator and rotor of the stepping motor;

FIG. 2 is a block diagram of the first embodiment of the present invention;

FIG. 4 shows the motor driving circuit used in the first embodiment and the peripheral circuits;

FIG. 6 is a block diagram of the second embodiment of the invention; and

DETAILED DESCRIPTION OF THE PREFERRED EMBODIMENTS

Figure 3:
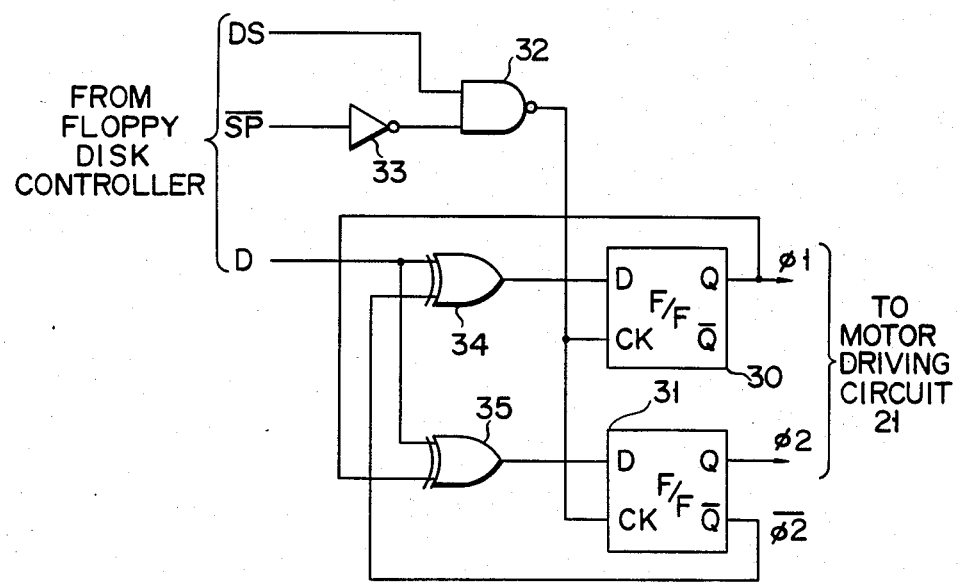
FIG. 3 is a circuit diagram of the motor controller used in the first embodiment.

A few embodiments of the invention will be described with reference to the accompanying drawings.

FIG. 2 schematically shows the first embodiment, i.e., an apparatus for controlling the stepping motor of a floppy disk drive. The apparatus comprises a motor driving circuit 21, a motor controller 22, two switching circuits 23 and 24, three monostable multivibrators 25-27, and two logic gates 28 and 29.

Circuit 21 applies an excitation voltage to the excitation coils of a stepping motor 20. This voltage corresponds to a phase pulse signal $\phi1$ or a phase pulse signal $\phi2$ supplied from controller 22. Motor controller 22 produces signal $\phi1$ or $\phi2$ in accordance with a drive selection signal DS, a step pulse signal $\overline{SP}$, and a direction signal D, all supplied from a floppy disk controller (FDC). Step pulse signal $\overline{SP}$ consists of pulses the number of which represents the distance the magnetic head of the floppy disk drive is to move. Direction signal D shows the direction in which the head is to move. Drive selection signal DS releases the floppy disk drive from standby state. Switching circuit 23 is controlled by the output of logic gate 28 to start or stop the supply of the excitation voltage to circuit 21. Switching circuit 24 is controlled by the output from logic gate 29 to select high voltage Va (e.g., 12 V) or low voltage Vb (e.g., 5

V) and to apply the selected voltage to the input terminal 23a of switching circuit 23.

The floppy disk controller supplies drive selection signal DS and a motor start signal MO to the input terminals of logic gate 28. Signal MO actuates a spindle motor for spinning the floppy disk loaded in the floppy disk drive.

Monostable multivibrator 25 is triggered by signal MO and generates a negative pulse signal $\overline{P1}$ having a pulse width T1. Monostable multivibrator 26 is triggered at the leading edge of the negative pulses of pulse signal $\overline{P1}$ and generates a positive pulse signal P2 having a pulse width T2. Monostable multivibrator 27 is triggered by the negative pulses of step pulse signal $\overline{SP}$ and generates a positive pulse signal P3 having a pulse width T3. Pulse signals P2 and P3 are supplied to the input terminals of logic gate 29.

As shown in FIG. 3, motor controller 22 comprises two D flip-flops 30 and 31, a NAND gate 32, a NOT gate 33 and two exclusive OR (EX-OR) gates 34 and 35. Flip-flops 30 and 31 supply pulse signals $\phi1$ and $\phi2$ through their output terminals Q to motor drive circuit 21. The output signal of EX-OR gate 34 is supplied to the data input terminal D of flip-flop 30, and the output signal of NAND gate 32 is fed to the clock terminal CK of flip-flop 30. Direction signal D is supplied to one input terminal of EX-OR gate 34, and the inverted output signal $\overline{\phi2}$ of flip-flop 31 is supplied to the other input terminal of gate 34. The output signal of EX-OR gate 35 is fed to the data input terminal D of flip-flop 31, and the output signal of NAND gate 32 is supplied to the clock terminal CK of flip-flop 31. Direction signal D is supplied to one input terminal of EX-OR gate 35, and the output signal $\phi1$ of flip-flop 30 is supplied to the other input terminal of EX-OR gate 35. Drive selection signal DS is supplied to one input terminal of NAND gate 32, and the step pulse signal $\overline{SP}$ is supplied to the other input terminal of NAND gate 32 from NOT gate 33.

Logic gates 28 and 29 are, for example, OR gates. Gate 28 may be NOR gates. When it is a NOR gate, motor drive circuit 21 and the peripheral circuits have the structures shown in FIG. 4.

Stepping motor 20 has two excitation phase coils. Motor drive circuit 21, therefore, has two identical sections for exciting these coils. For brevity, only one of these coils, i.e., coil 20a, and only the first of the sections of circuit 31 are shown in FIG. 4.

The first section of motor drive circuit 21 comprises transistors 40–43, buffer amplifiers 44 and 45 and NOT gates 46 and 47. These elements are operated by the power supply voltage Vc. i.e., 5 V (FIG. 2). The excitation phase pulse signal $\phi1$ output by motor controller 22 is supplied to the input terminals of buffer amplifiers 44 and 45 and NOT gates 46 and 47. Transistors 40 and 41 are NPN type and are connected in series. The connecting point between them is coupled to one end of the excitation phase coil 20a of motor 20. Transistor 40 is operated by signal $\phi1$ fed to its base from buffer amplifier 44. Transistor 41 is operated by a signal supplied to its base and obtained by inverting signal $\phi1$ from NOT gate 46. Transistors 42 and 43 are NPN type and are connected in series. The connection point between these transistors is coupled to the other end of the excitation phase coil 20a. Transistor 43 is driven by signal $\phi1$ is supplied to its base from buffer amplifier 45. Transistor 42 is driven by a signal fed to its base and obtained by inverting signal $\phi1$ from NOT gate 47.

The second section of motor drive circuit 21, which is identical with the first section, includes two buffer amplifiers and two NOT gates. Excitation phase pulse signal $\phi2$ is supplied to the input terminals of these buffer amplifiers and NOT gates from controller 22.

As shown in FIG. 4, switching circuit 23 comprises a PNP transistor 48 and a resistor connected to the base of this transistor. The collector of transistor 48 is coupled to those of transistor 40 and 42 of circuit 21. Transistor 48 performs a switching operation when the output signal of NOR gate 28 is fed to its base. Drive select signal DS and motor start signal MO from FDC are supplied to the input terminals of NOR gate 28.

Switching circuit 24 comprises a transistor 49, a diode 50 whose cathode is coupled to the collector of transistor 49, and a NOT gate 51 whose output is coupled to the base of transistor 49 by a resistor. The connecting point between transistor 49 and diode 50 is coupled to the emitter of transistor 48 of circuit 23. Transistor 49 performs a switching operation when the output signal of NOT gate 51 is supplied to its base. NOT gate 51 inverts signal PS output by an OR gate (not shown) which corresponds to logic gate 29 shown in FIG. 2, thus supplying signal PS to the base of transistor 49. High voltage Va (12 V) is applied to the emitter of transistor 49, and low voltage Vb (5 V) to the anode of diode 50.

The operation of the apparatus shown in FIGS. 2 and 4 will now be explained with reference to FIGS. 5A–5D.

Suppose the floppy disk drive is in standby state. Both drive select signal DS and motor start signal MO are at logical level L. Therefore, the movable contact of switching circuit 23 contacts fixed contact 23b, and no excitation voltage is applied to motor drive circuit 21. The magnetic head of the floppy disk drive stays at one of the tracks of the floppy disk. The spindle motor of the disk drive does not rotate since signal MO is at logical level L.

When the host computer (not shown) makes an access to the floppy disk drive, drive select signal DS rises to logical level H. The disk drive is released from the standby state. Transistor 48 of switching circuit 23 is turned on, and the excitation voltage can be applied to motor drive circuit 21. The FDC has yet to output motor start signal MO or step pulse signal $\overline{SP}$, and signal PS from OR gate 29 is still at logical level L. The movable contact of switching circuit 24 moves to fixed contact 24b, and low voltage Vb is applied to input terminal 23a of switching circuit 23. Transistor 49 of circuit 24 is off, and low voltage Vb is applied to switching circuit 23. Hence, excitation voltage V, or low voltage Vb, is applied to motor drive circuit 21.

Figure 5A:
FIGS. 5A-5D are timing charts explaining how the first embodimnt operates.
Figure 5B:
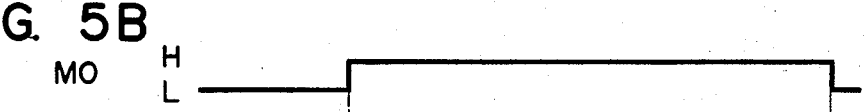
Figure 5C:
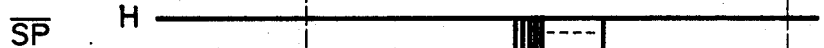
Figure 5D:
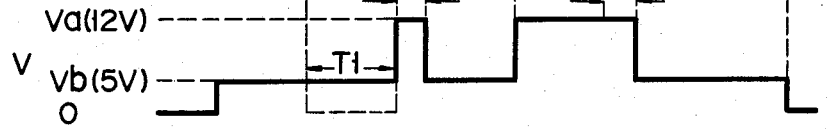

When motor start signal MO from FDC rises to level H, the spindle motor starts, thus rotating the floppy disk. Signal MO triggers monostable multivibrator 25 (FIG. 2). Multivibrator 25 outputs a negative pulse $\overline{P1}$ of pulse width T1 to monostable multivibrator 26. During period T1, or pulse width T1 of pulse $\overline{P1}$, low voltage Vb is applied to motor drive circuit 21 as illustrated in FIG. 5D. Period T1 ranges from 100 ms to 300 ms and is shorter than the time which lapses from the start of the spindle motor to the start of the read/write operation of the magnetic head.

Monostable multivibrator 26 is triggered at the leading edge of negative pulse $\overline{P1}$. It outputs positive pulse P2 having a pulse width T2. Pulse P2 is supplied to OR gate 29. Output signal PS of OR gate 29 rises to logical level H. The movable contact of switching circuit 24, which is responsive to signal PS, moves to fixed contact 24a. This switching state continues during period T2 (i.e., pulse width T2 of positive pulse P2). Hence, high voltage Va is applied through switching circuits 24 and 23 to motor drive circuit 21 during period T2 as shown in FIG. 5D. Voltage Va is therefore applied to excitation phase coil 20a, so that motor 20 may be driven with a great torque. Nonetheless, the rotor of motor 20 is held since step pulse $\overline{SP}$ is not supplied to motor 20.

Since the rotor of stepping motor 20 is held by the great torque, the magnetic head is positioned at the same track as when the floppy disk drive was in the standby state. Motor 20 correctly positions the magnetic head at the desired track. Period T2 (FIG. 5D) ranges from 25 ms to 30 ms and is longer than the time the magnetic head takes to be stably held at any desired track. In other words, period T2 is a time period necessary to place and stably hold the magnetic head at a predetermined position when it is displaced by an external force, etc., while it is in the standby state.

When pulse P2 of monostable multivibrator 26 rises to logical level H, output signal PS of OR gate 29 falls to logical level L. Hence, the movable contact of switching circuit 24 moves to fixed contact 24b, whereby low voltage Vb is applied to motor drive circuit 21. Stepping motor 20 is driven by low voltage Vb while the magnetic head is writing or reading data, during which period motor 20 does not require a large torque. This helps to save electrical power.

When the FDC outputs a step pulse signal $\overline{SP}$, monostable multivibrator 27 is triggered by the first pulse of signal $\overline{SP}$ and outputs a positive pulse signal P3 to OR gate 29. Signal PS from OR gate 29 rises to logical level H. The movable contact of switching circuit 24 moves to fixed contact 24a, whereby excitation voltage V applied to motor drive circuit 21 is changed to high voltage Va. In short, when the FDC outputs a pulse, voltage Va is applied to motor drive circuit 21. Circuit 21 applies high voltage Va to excitation phase coils 20a upon receipt of excitation phase pulse signal $\phi 1$ or $\phi 2$ supplied from motor controller 22. Hence, stepping motor 20 rotates with a large torque, thus moving the magnetic head for the distance proportional to the number of pules forming step pulse signal $\overline{SP}$. Since signal $\phi 1$ or $\phi 2$ excite the phase coil designated by step pulse signal $\overline{SP}$ and direction signal D as shown in FIG. 3, motor 20 moves the magnetic head in the direction designated by signal D to the desired track.

When the magnetic head reaches the desired track, the FDC stops supplying step pulse signal $\overline{SP}$. Monostable multivibrator 27 is triggered at the leading edge of the last pulse of signal $\overline{SP}$ and generates a positive pulse signal P3. This pulse signal having a pulse width T3 is supplied to OR gate 29. Hence, as shown in FIG. 5D, high voltage Va is applied via circuits 24 and 23 to motor drive circuit 21 for period T3 after FDC has stopped generating signal $\overline{SP}$. Motor 20 therefore holds the magnetic head correctly at the desired track.

As described above, high voltage Va is applied to stepping motor 20 for period T2 after the floppy disk drive has been released from the standby state, thereby holding the magnetic head at the same track. Hence, the head can correctly write data on this track or read data therefrom. During the non-seek operation of the head, except for period T2 (FIG. 5D), low voltage is applied to motor. This saves power.

FIG. 6 shows the second embodiment of the present invention, which is identical with the first embodiment except that it includes a motor drive circuit 21, switch circuit 24 and 60, and a motor controller 22 which are different from those of the first embodiment. In this embodiment, a switch circuit 60 is driven by the output signal of a logic gate 28 to apply a drive voltage Vc (e.g., 5 V) to a motor driving circuit 21. Another switch circuit 24 is provided to select high voltage Va or low voltage Vb in accordance with the output signal PS of a logic gate 29 and to apply the selected voltage to circuit 21. When logic gate 28 is a NOR gate, circuit 21 and its peripheral circuits have the structures shown in FIG. 7.

Figure 7:
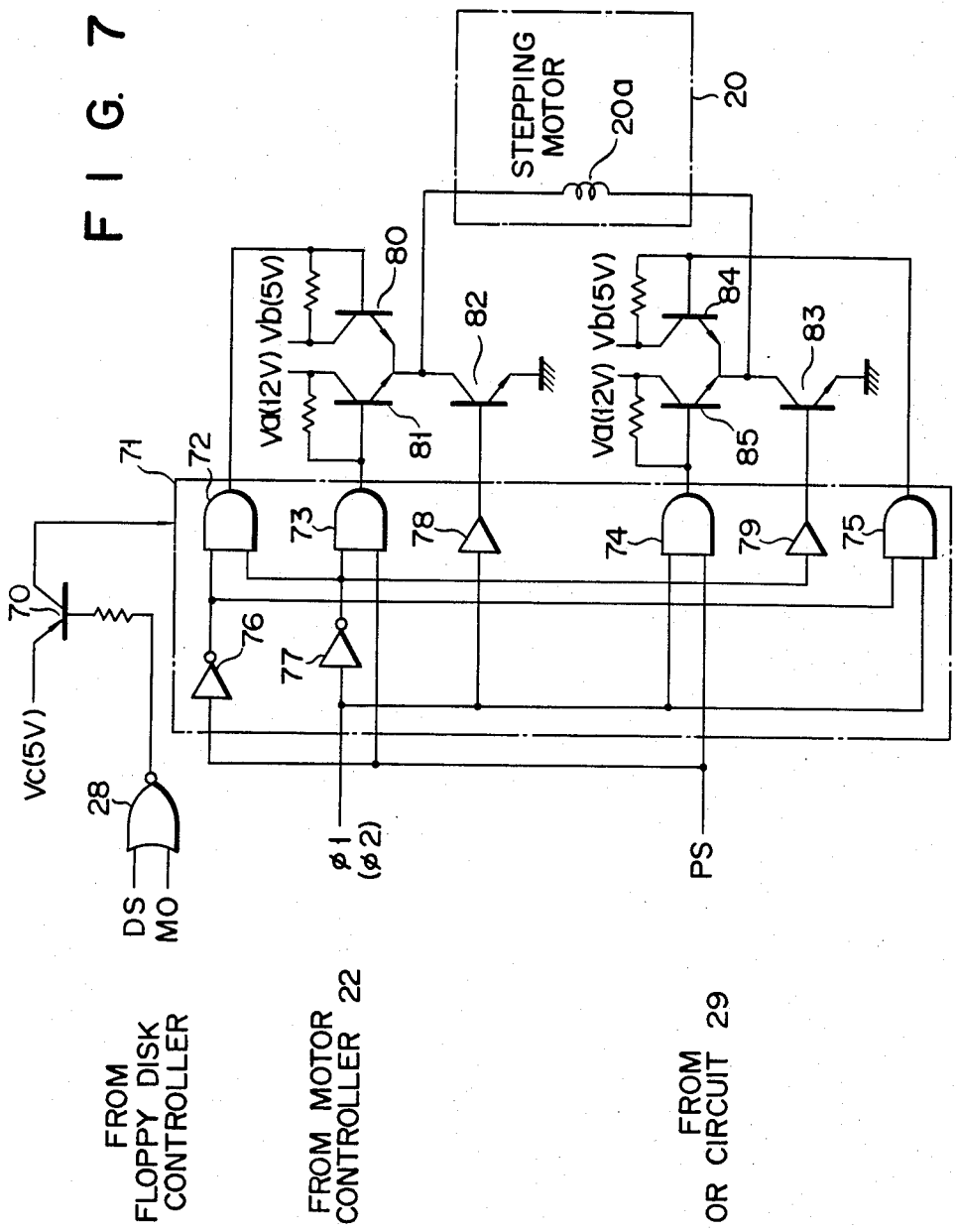
FIG. 7 shows the motor driving circuit used in the second embodiment and the peripheral circuits.

As illustrated in FIG. 7, switch circuit 60 has a PNP transistor 70. When the output signal of NOR gate 28 is supplied to its base, PNP transistor 70 applies voltage Vc to motor driving circuit 21 and a logic circuit 71 which is one of the components of switch circuit 24. Logic circuit 71 has AND gates 72–75, NOT gates 76 and 77, and buffer amplifiers 78 and 79. NOT gate 76 inverts the output signal PS of OR gate 29 and supplies the inverted signal to one input terminal of AND gate 72. NOT gate 77 inverts excitation phase pulse signal $\phi 1$ from the FDC and supplies the inverted pulse signal to the other input terminal of AND gate 72. The output of AND gate 72 is supplied to the base of an NPN transistor 80 which is another component of switch circuit 24. Driven by the output signal of AND gate 72, transistor 80 applies low voltage Vb via its emitter to the collector of an NPN transistor 82. NPN transistor 82 is one of the components of motor drive circuit 21. Its collector is coupled to one end of the excitation phase coil 20a of a stepping motor 20.

NOT gate 77 inverts pulse signal $\phi 1$ from the FDC and supplies the inverted signal to one input terminal of AND gate 73. Signal PS from OR gate 29 is fed to the other input terminal of AND gate 73. The output signal of AND gate 73 is supplied to the base of an NPN transistor 81 which is another component of switch circuit 24. Driven by the output signal of AND gate 73, transistor 81 applies high voltage Va from its emitter to the collector of NPN transistor 82. Pulse signal $\phi 1$ from the FDC is fed through buffer amplifier 78 to the base of NPN transistor 82.

The other end of coil 20a is connected to the collector of an NPN transistor 83 which is a component of motor drive circuit 21. The output signal of NOT gate 77, which has been obtained by inverting pulse signal $\phi 1$ is supplied via buffer amplifier 79 to the base of NPN transistor 83. Pulse signal $\phi 1$ and the output signal PS of OR gate 29 are supplied to the input terminals of AND gate 74. The output of AND gate 74 is fed to the base of NPN transistor 85 which is another component of switch circuit 24. Driven by the output signal of AND gate 74, transistor 85 applies high voltage Va via its emitter to the collector of NPN transistor 83. The output signal of NOT gate 76, which is the inverted output signal PS of OR gate 29, and pulse signal $\phi 1$ from the FDC are supplied to the input terminals of AND gate 75. The output of AND gate 75 is supplied to the base of a NPN transistor 84 which is another component of switch circuit 24. Driven by the output from AND gate 75, transistor 84 applies low voltgage via its emitter to the collector of NPN transistor 83.

Motor 20 has two excitation phase coils. Motor drive circuit 21, therefore, has two identical sections for exciting these coils. For brevity, only one of these coils, i.e., coil 20a, and only the first of the sections of circuit 21 are shown in FIG. 7.

In the embodiment of FIG. 6, as long as the floppy disk drive assumes the standby state, the output signal of OR gate 28 is at logical level L and the movable contact of switch circuit 60 contacts fixed contact 60a (i.e., open terminal). Hence, voltage Vc is not applied to motor drive circuit 21 until the disk drive comes out of the standby state. When drive select signal DS rises, the disk drive is released from the standby state. As a result, the movable contact of switch circuit 60 moves to fixed contact 60b, whereby voltage Vc is applied to circuit 21. Hence, power can be saved still more than in the first embodiment. Excitation voltage V is applied to switch circuit 24 even while the disk drive remains in the standby state. However, as evident from FIG. 7, neither transistor 82 or 83 operates when motor drive circuit 21 does not operate. Therefore, voltage V is not applied to the coil 20a of motor 20 until circuit 21 starts. The second embodiment of FIG. 6 has the same advantages as the first, and is superior in respect of power saving.

What is claimed is:

1. A stepping motor control apparatus for a positioning device comprising:
   a stepping motor having excitation coils;
   stepping motor driving means for applying a high or low excitation voltage to the excitation coils when the positioning device is in a non-standby state and for stopping the application of the excitation voltage when the positioning device is in a standby state; and
   control means for controlling said stepping motor driving means such that, after the positioning device has come out of the standby state, said stepping motor driving means applies a high excitation voltage to the excitation coils of the stepping motor for a predetermined period needed to place and stably hold the positioning device at a predetermined position.

2. A stepping motor control apparatus for a positioning device comprising:
   a stepping motor having excitation coils;
   motor driving means for applying an excitation voltage to the excitation coils;
   excitation voltage supply means for stopping the supply of the excitation voltage to the motor driving means when the positioning device is in a standby state, and for starting the supply of the excitation voltage to the motor driving means when the positioning device comes out of the standby state;
   voltage switching means for applying a high excitation voltage to said excitation voltge supply means to rotate the motor after the positioning device has come out of the standby state, and for applying a low excitation voltage to said excitation voltage supply means when the stepping motor is ready to rotate; and
   control means for controlling the voltage switching means such that, after said positioning device has come out of the standby state, the voltage switching means applies a high voltage for a predetermined period needed to place and stably hold the positioning device at a predetermined position.

3. A stepping motor control apparatus according to claim 2, wherein said control means includes pulse generating means for generating a pulse having a predetermined pulse width after said positioning device has been released from the standby state, said pulse controlling said voltage switching means such that a high voltage is applied to said motor driving means.

4. A stepping motor control apparatus according to claim 3, wherein said voltage switching means includes a switching circuit operated by the pulse signal supplied from said control means to apply one of high and low voltages to said excitation voltage supply means.

5. A stepping motor control apparatus according to claim 4, wherein said voltage switching means includes a switching circuit with a transistor, said switching circuit applying the high voltage to said excitation voltage supply means when said transistor is on, and the low voltage to said excitation voltage supply means when said transistor is off.

6. A stepping motor control apparatus for a positioning device comprising:
   a stepping motor having excitation coils;
   motor driving means for applying an excitation voltage to the excitation coils;
   voltage supply control means for stopping the supply of the excitation voltage to the motor driving means when the positioning device is in a standby state, and for starting the supply of the excitation voltage to the motor driving means when the positioning device comes out of the standby state;
   excitation voltage switching means for applying a high excitation voltage to said motor driving means to rotate the motor after the positioning device has come out of the standby state, and for applying a low excitation voltage to said motor driving means when the stepping motor is ready to rotate; and
   control means for controlling said excitation voltage switching means such that, after said positioning device has come out of the standby state, said excitation voltage switching means applies a high voltage for a predetermined period needed to place and stably hold the positioning device at a predetermined position.

7. A stepping motor control apparatus according to claim 6, wherein said control means includes pulse signal generating means for generating a pulse signal having a predetermined pulse width after said positioning device has been relesed from the standby state, said pulse signal controlling said excitation voltage switching means such that a high voltage is applied to said motor driving means.

8. A stepping motor control apparatus according to claim 7, wherein said excitation voltage switching means includes a switching circuit operated by the pulse signal supplied from said control means to apply one of high and low voltages to said motor driving means.

9. A stepping motor control apparatus according to claim 8, wherein said switching circuit has two transistors, said switching circuit applying the high voltage to said motor driving means when the first transistor is on, and the low voltage to said motor driving means when the second transistor is on.

* * * * *